(12) United States Patent
Wickham (10) Patent No.: US 8,306,663 B2
(45) Date of Patent: Nov. 6, 2012

(54) ROBOT WITH 3D GRASPING CAPABILITY

(75) Inventor: Joseph S. Wickham, Simi Valley, CA (US)

(73) Assignee: Robotic Harvesting LLC, Simi Valley, CA (US)

( * ) Notice: Subject to any disclaimer, the term of this patent is extended or adjusted under 35 U.S.C. 154(b) by 304 days.

(21) Appl. No.: 12/777,751

(22) Filed: May 11, 2010

(65) Prior Publication Data

US 2010/0292841 A1  Nov. 18, 2010

Related U.S. Application Data

(60) Provisional application No. 61/177,757, filed on May 13, 2009.

(51) Int. Cl.
*G05B 15/00* (2006.01)
(52) U.S. Cl. ............................................. 700/259
(58) Field of Classification Search ............... 700/259; 901/2, 14, 15; 56/10.1, 328.1, 329
See application file for complete search history.

(56) References Cited

U.S. PATENT DOCUMENTS

| 4,519,193 | A | * | 5/1985 | Yoshida et al. | 56/328.1 |
| 4,663,925 | A | * | 5/1987 | Terada | 56/328.1 |
| 5,544,474 | A | * | 8/1996 | Finkelstein | 56/10.2 A |
| 5,911,669 | A | * | 6/1999 | Stentz et al. | 56/10.2 F |
| 6,009,186 | A | * | 12/1999 | Gorretta et al. | 382/110 |
| 6,671,582 | B1 | * | 12/2003 | Hanley | 700/245 |
| 2012/0096823 | A1 | * | 4/2012 | Moore | 56/10.1 |

* cited by examiner

*Primary Examiner* — Faye M. Fleming
(74) *Attorney, Agent, or Firm* — Lowe Hauptman Ham & Berner LLP (57) ABSTRACT

A robotic harvester has a mobile platform. A programmable multi-axis robot arm is connected to the platform. The robot arm is mounted to a computer controller. A stereovision camera connected to the computer is mounted on the mobile platform. The camera views the area under the mobile platform and identifies objects in geometric coordinates. The robot arm is directed to the location of the object and a gripper on the robot arm grasps the object. The stem is separated from the object and the object is deposited on a sorting conveyor. The harvester is incrementally moved. A method of harvesting is disclosed.

9 Claims, 13 Drawing Sheets

ROBOT WITH 3D GRASPING CAPABILITY

CROSS REFERENCE TO RELATED APPLICATIONS

This application is related to, and incorporates herein, the disclosure of provisional application Ser. No. 61/177,757, filed May 13, 2009 and discloses and claims further improvements therein.

FIELD OF THE INVENTION

The present invention relates to the improvement in robotic devices, especially robotic devices which automatically identify objects to be grasped and picked up and the gripper to retrieve said objects.

BACKGROUND OF THE INVENTION

In the fields such as agriculture, construction, or manufacturing there are often situations where objects with unknown size need to be grasped at various points in 3D space. For example, in agriculture, strawberries can vary significantly in size and may be hanging at various heights in the air or laying on uneven ground. Being able to grasp these objects at any point in 3D space with a robot gripper would result in productivity gains by accelerating the harvest and reducing manual labor.

BRIEF SUMMARY OF THE INVENTION

It is an object of the present invention to disclose an automatic harvester which has a camera and a computer which identifies, in 3D, the location of an object to be harvested and directs a multi-axis robot arm with a gripper to the retrieval of the object. The harvester is moved forward automatically.

It is a further object of the present invention to disclose a gripper having a plurality of movable fingers, each having a pivotable finger tip which grasps the object.

In accordance with the teachings of the present invention, there is disclosed a robotic harvester comprising a mobile platform with a power source. A programmable multi-axis robot arm is connected to the robotic harvester. A master controller is connected to the robotic arm. A stereovision camera is mounted on the mobile platform. The master controller is a computer having software programmed to control the robot arm, to control the harvester and to relate the stereovision camera to the robot arm. A gripper is attached to the robot arm and controllable by the computer. The stereovision camera, with a single measurement, locates and identifies an object in geometric 3D coordinates. The computer directs the robot arm to the object using the geometric 3D coordinates and the gripper grasps the object and removes the object.

In further accordance with the teachings of the present invention, there is disclosed a gripper to assist in the mechanized harvesting of produce. The gripper has a base and a plurality of spaced-apart movable fingers attached to the base and extending outwardly therefrom. Each finger has a pivotable finger tip attached thereto. At least one retaining wall is formed on the fingers. The finger tips are rotatable toward each other forming a scoop-like structure wherein the produce may be retained in the gripper.

In still further accordance with the teachings of the present invention, there is disclosed a method of harvesting crops automatically. A mobile platform is provided with a power source. A programmable multi-axis mobile arm having a gripper with fingers is connected to the mobile platform. A stereovision camera is mounted on the mobile platform. A computer is provided having software programmed to control the robot arm and the gripper and to relate the stereovision camera to the robot arm. A stereo image of 3D space is recorded of a region by the platform. The software is used to analyze the image to determine if objects meeting certain criteria exist within the region. The software is used to calculate XYZ coordinates of the location of each recognized object. The robot arm is moved to scoop the recognized object into the gripper. The fingers on the gripper are closed to retain the recognized object. The recognized object is raised a predetermined height and the tension is measured on a stem attached to the recognized object. A piston plunger within the gripper is moved to forcibly retain the recognized object. The robot arm with the gripper is moved sideways with respect to the stem to separate the recognized object from the stem. The robot arm is moved over a sorting conveyor on the mobile platform and the gripper is opened to deposit the recognized object on the sorting conveyor. These steps are repeated for remaining objects. The mobile platform is advanced a predetermined distance. A leaf canopy spreader is provided if heavy foliage exists and the leaf canopy spreader is activated to uncover objects. Repeating the above steps These and other objects of the present invention will become apparent from a reading of the following specification taken in conjunction with the enclosed drawings.

BRIEF DESCRIPTION OF THE DRAWINGS

FIG. 7A Stereovision camera takes a picture and then computer analyzes pixels to calculate location of object.

FIG. 7B Computer directs robot gripper to enclose object.

FIG. 7C Fingertips wrap around object.

FIG. 7D Gripper moves away from plant, causing stem attachment area to rotate due to stem tension.

FIG. 7E Piston plunger pins object against fingertips.

FIG. 7F Gripper moves sideways, causing stem to detach. Exact motion depends on fruit or vegetable.

DESCRIPTION OF THE INVENTION

Figure 1:
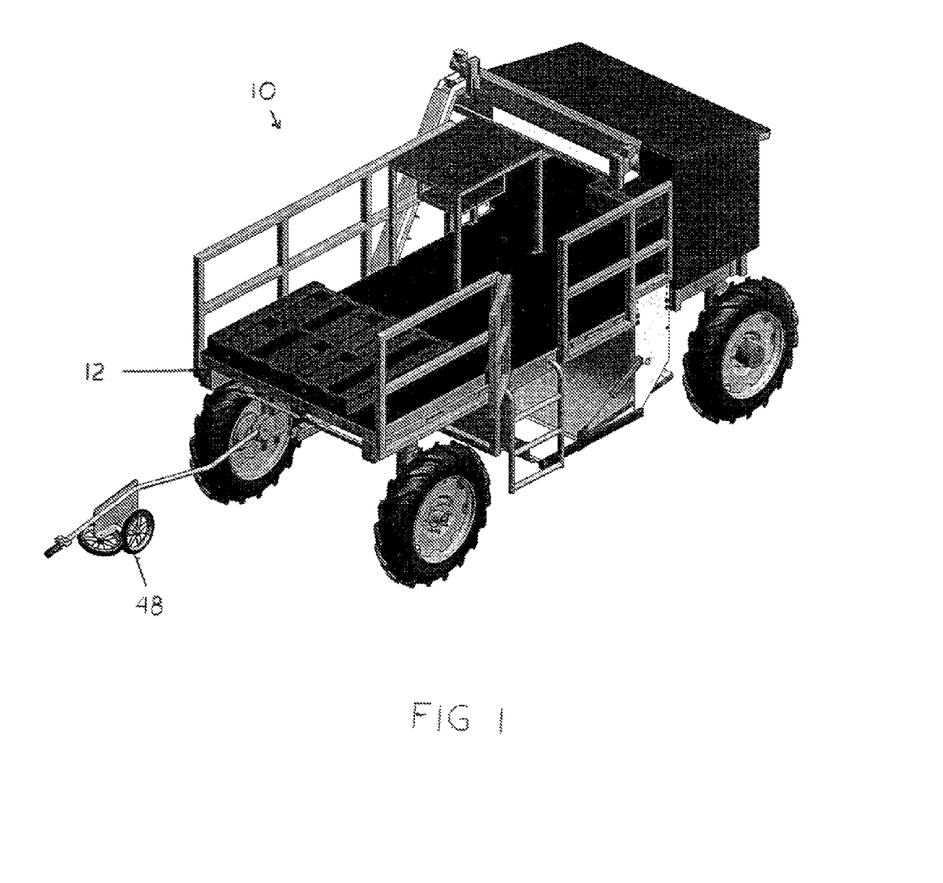
FIG. 1 is a right front perspective view of the harvester of the present invention.
Figure 2:
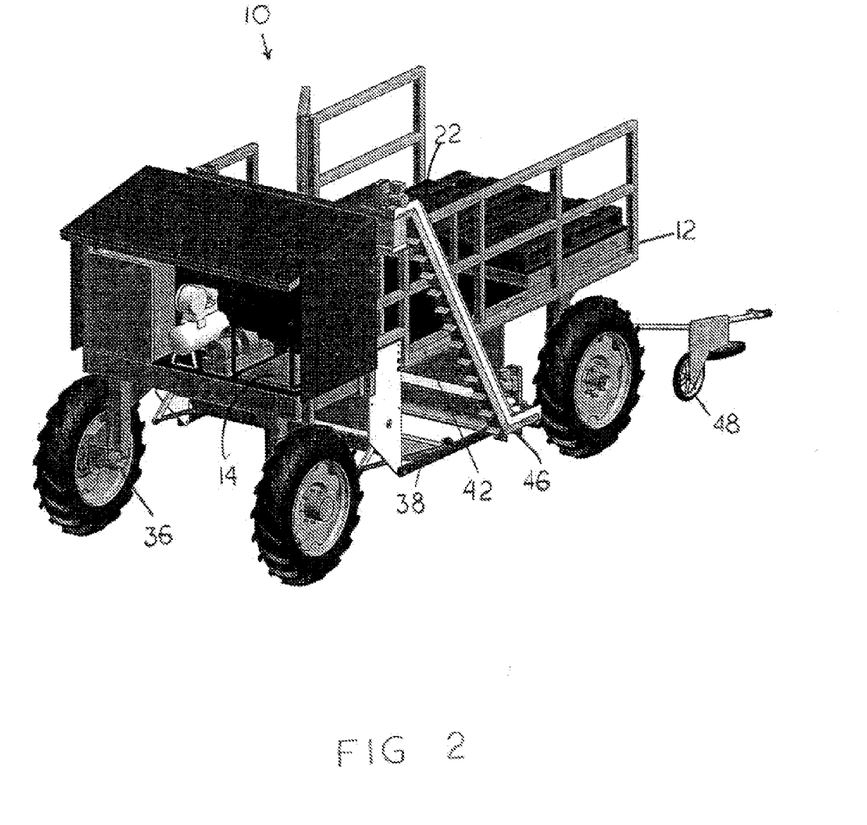
FIG. 2 is a right rear perspective view of the harvester of the present invention.
Figure 3:
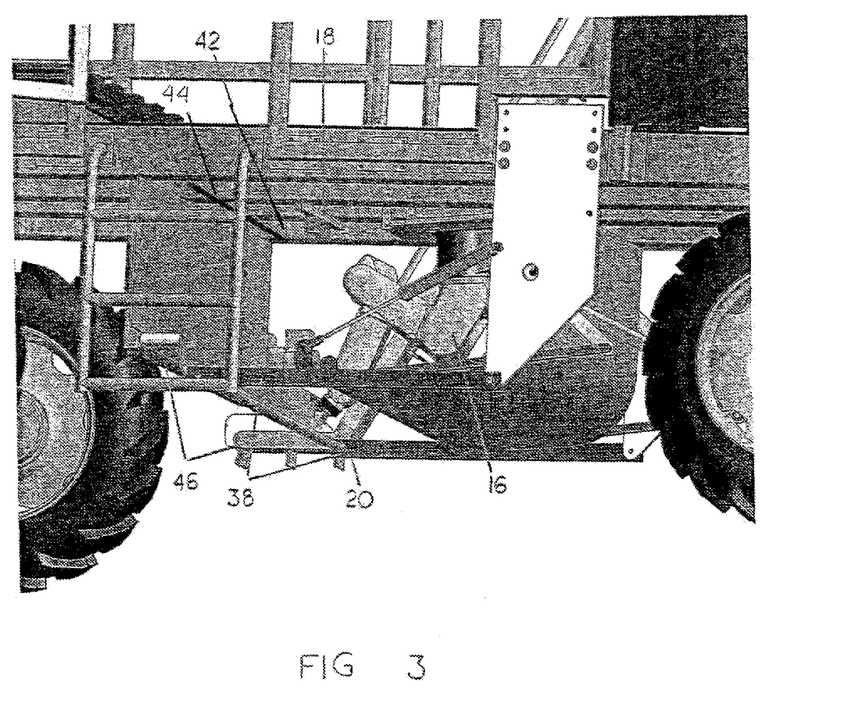
FIG. 3 is a left side view of the harvester of the present invention.

Referring now to FIGS. 1-3, a robotic harvester 10 has a mobile platform 12 with a power source 14. A programmable multi-axis robot arm 16 is connected to the harvester 10, preferably within a hood area 42. A stereovision camera 18 is mounted on the harvester, preferably within the hood area 42 near the robot arm 16 so the camera views a gripper 20 which is disposed on an end of the robot arm 16 under the hood. The stereovision camera takes electronic pictures of the items in its field of view 16. The pictures' pixel values from a single camera measurement are subjected to proprietary and sophisticated mathematical analysis by an onboard computer 22 which serves as a master controller for the system. These different software algorithms include color segmentation, texture discrimination, shape fitting, cluster analysis, spatial grouping, and outlier rejection. The outlier rejection is a value which is judged to be outside of the norm. If pixel values meeting certain criteria are found (for example, ones having "red" values or a specific geometric shape, such as a sphere), then triangulation and localization in 3D can be performed to determine the X-Y-Z coordinates of the identified objects. In the prior art, pixels in two camera fields are matched to determine an XYZ location. The present device uses a single camera measurement and the location of the geometric shape is calculated in 3D space using geometric formulae. The computer then directs the robot arm to the identified coordinates to enclose the area within the gripper 20.

The robot arm 16 is calibrated with the stereovision camera so that the camera coordinates can be recalculated for the robot's coordinate system. Based on this information, the robot arm 16 can then reach out and grasp the identified object 30 and move it to another location.

Although the description and drawings herein are directed to a single robot, a practical harvester will have a plurality of robots.

Figure 4:
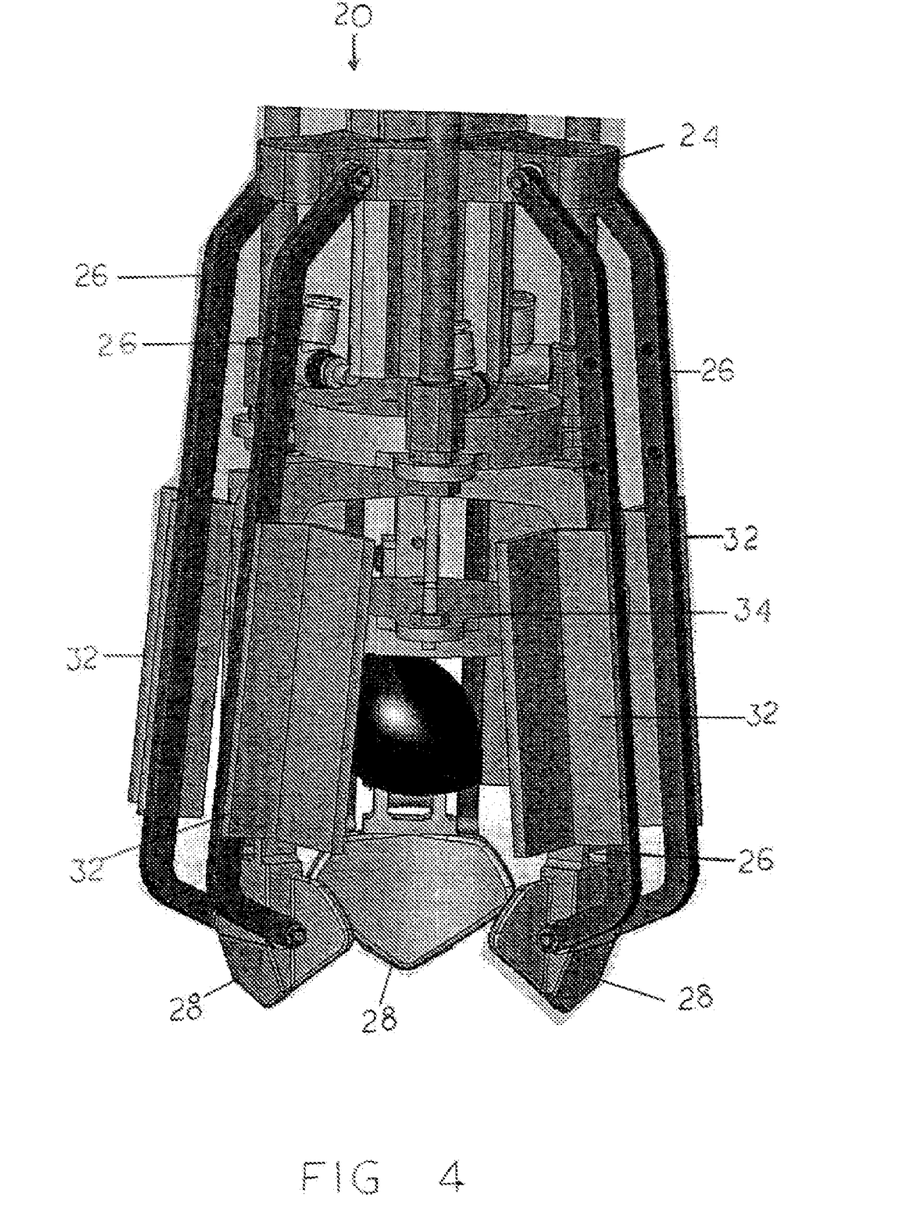
FIG. 4 is a side elevation view of the gripper.
Figure 5:
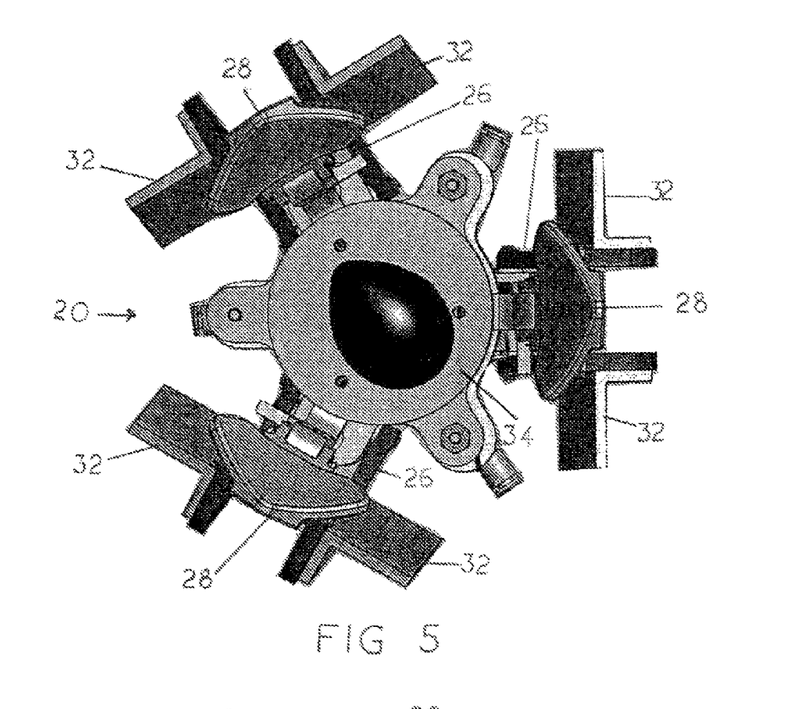
FIG. 5 is a bottom view of the open gripper of the present invention.
Figure 6:
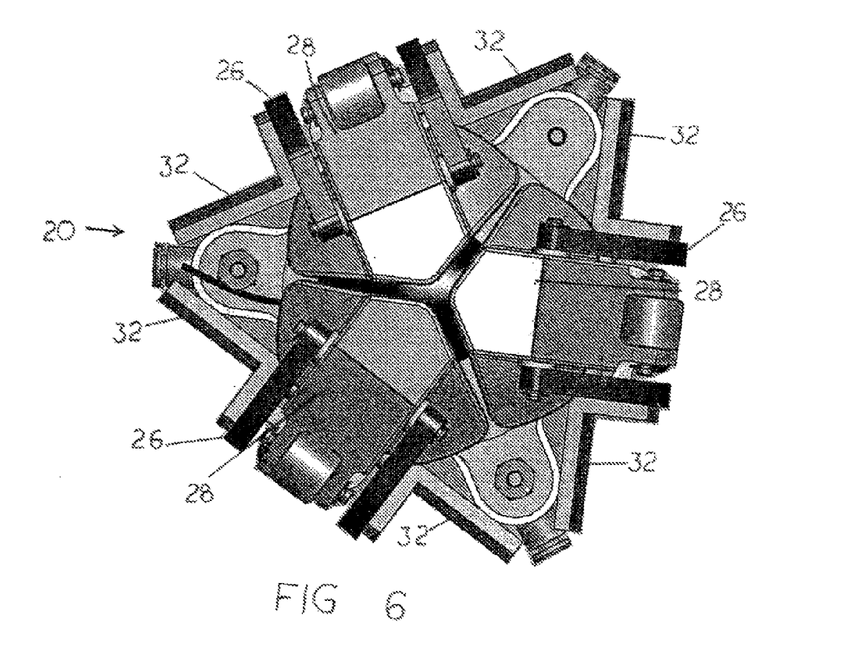
FIG. 6 is a bottom view of the closed gripper of the present invention.
Figure 7A:
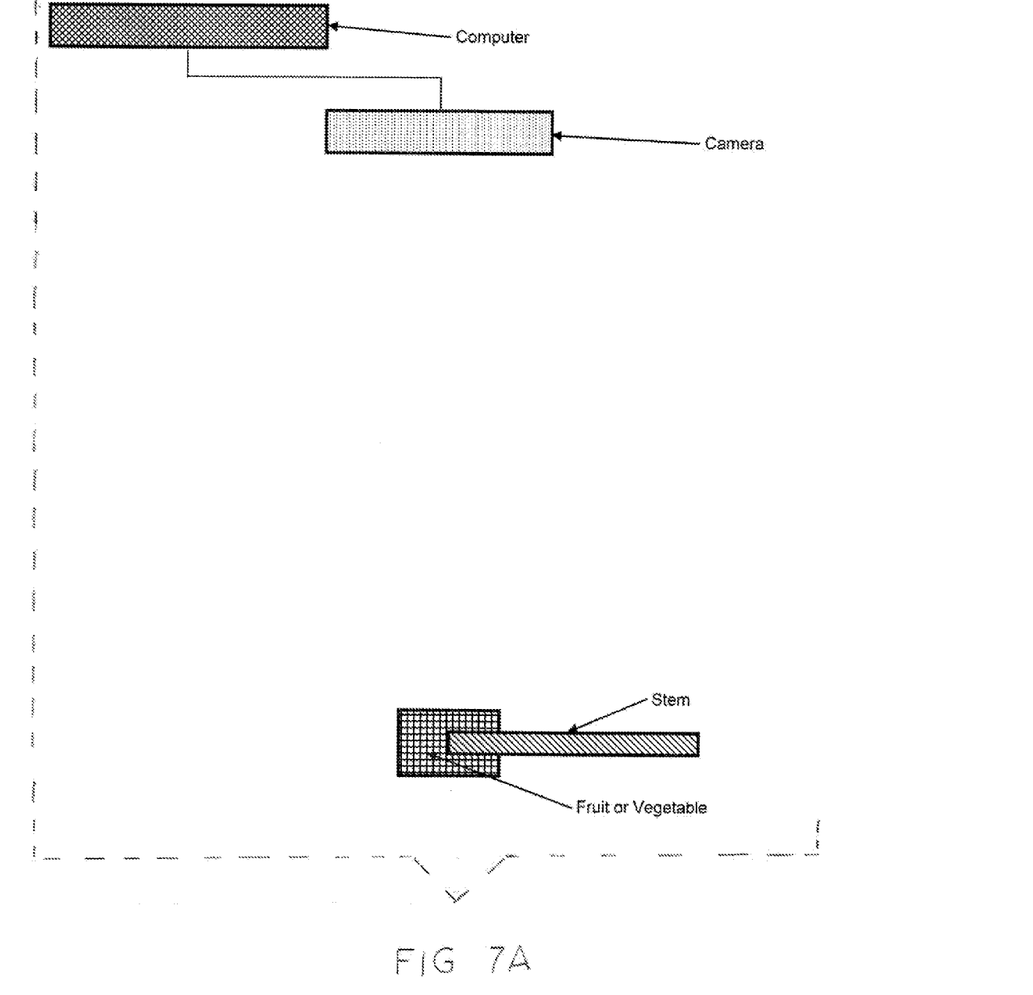
FIGS. 7A-7F is a sequence of views which diagrammatically shows the operation of the camera and the gripper.
Figure 7B:
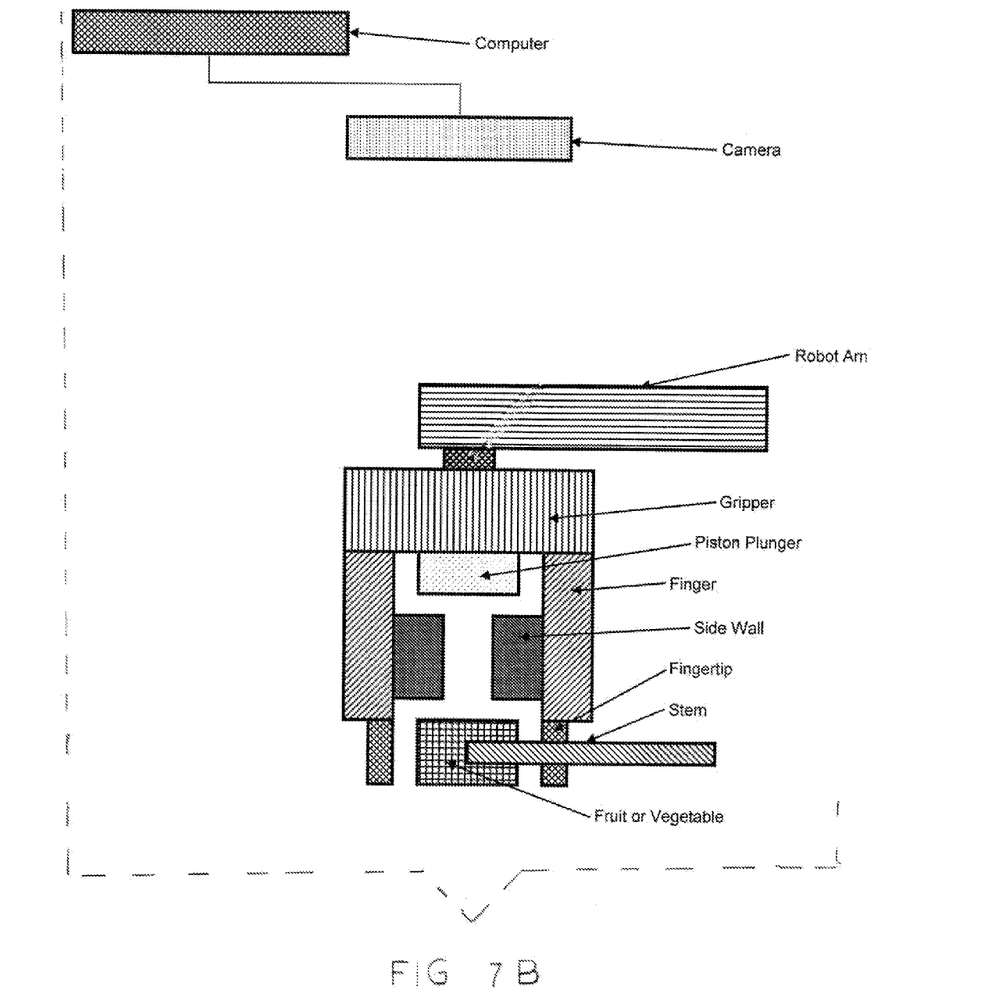
Figure 7C:
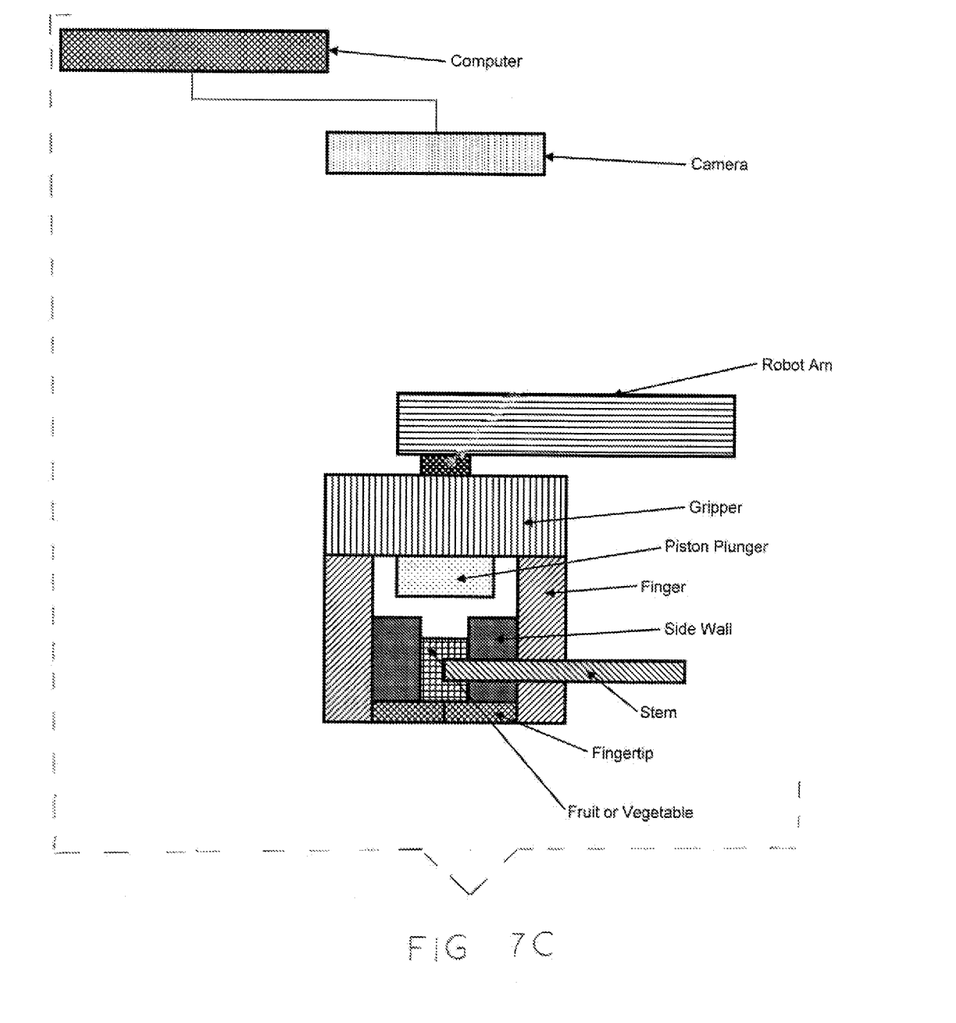
Figure 7D:
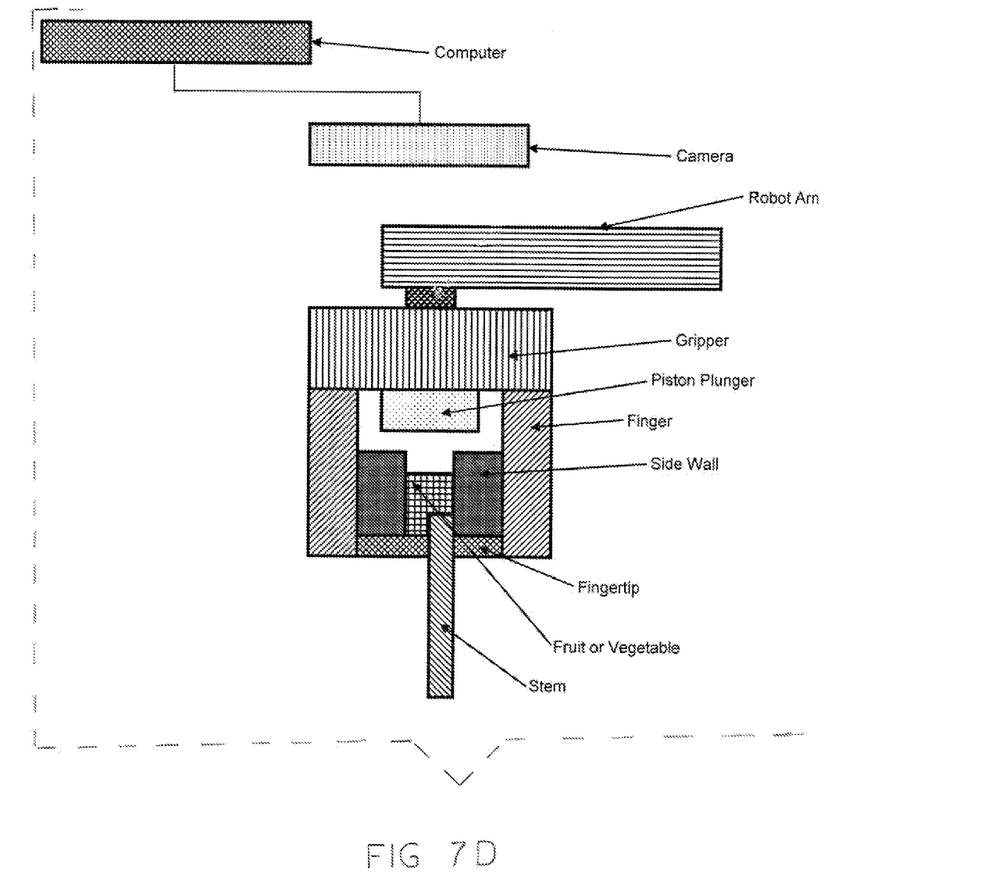
Figure 7E:
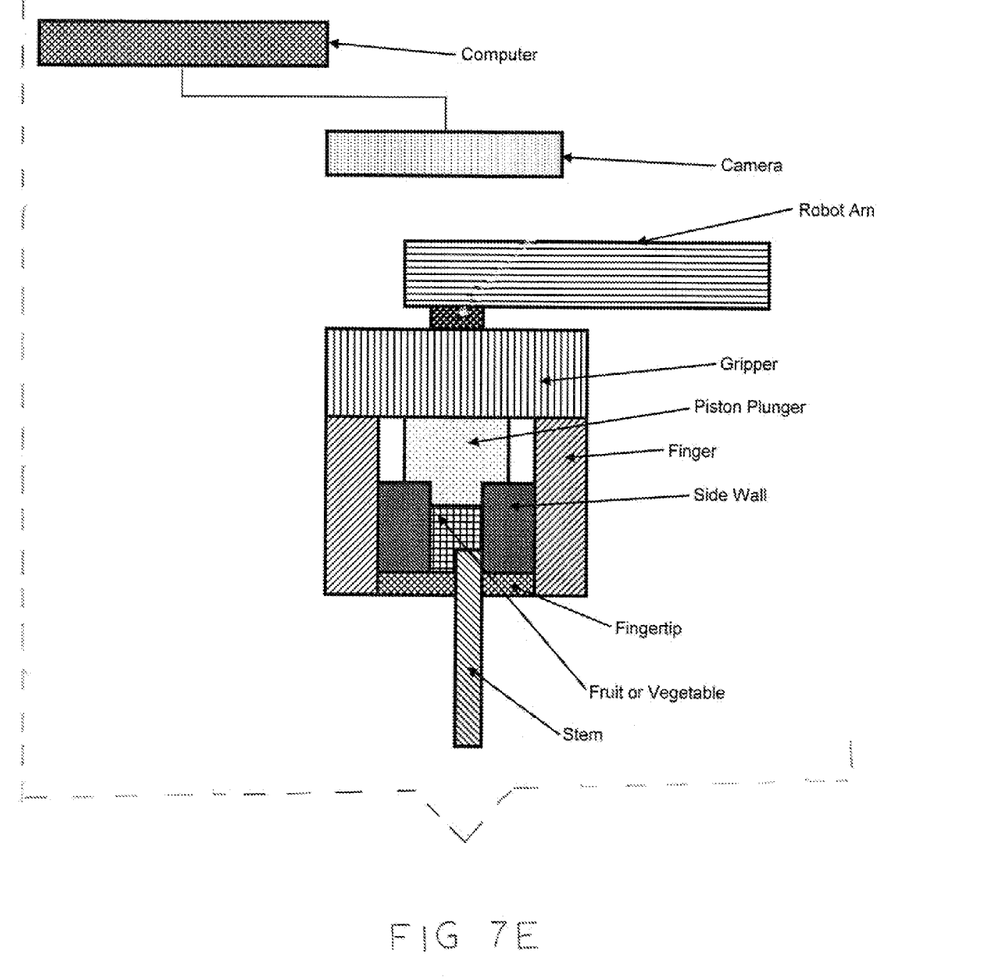
Figure 7F:
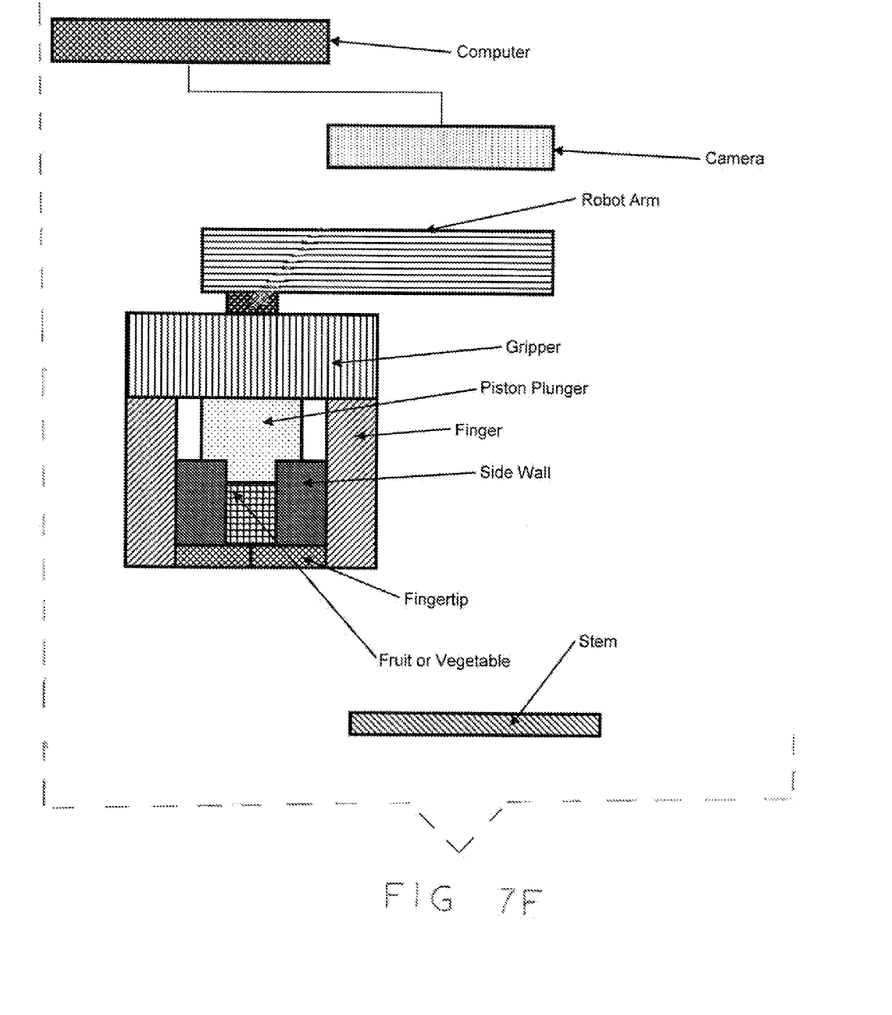

As shown in FIGS. 4-6, the gripper 20 has a base 24. A plurality of spaced-apart movable fingers 26 extend outwardly from the base 24. Each finger 26 has a pivoting finger tip 28. The finger tips 28 are rotatable toward each other. The identified object 30 is grasped between the fingers of the gripper 20. The design of the gripper provides a scoop-like structure for the object to be scooped up before it is held in place. The finger tips 28 pivot to hold the object within the fingers 26. At least one and preferably a plurality of retaining walls 32 are formed on the fingers 26 to further assist holding the object within the scooped area.

As shown in FIGS. 7A-7F, when the object is a fruit to be harvested, such as a strawberry, the camera 18 identified the red color of a ripe berry and directs the gripper to the berry. Berries which are not ripe and are not red, are avoided. The stem of the berry is disposed and held between the spaced-apart fingers 26 and the robot arm 16 is elevated so that the stem, attached to the plant is pulled toward the finger tips 28 and there is tension on the stem. When a predetermined tension is measured on the stem, a piston plunger 34 connected to the base of the gripper is activated to pin the object within the gripper to prevent later movement of the object. The robot arm 16 is then moved sideways with respect to the stem to separate the object from the stem, with the object being retained in the gripper. In this manner, the stem is removed completely or very close to the object without damaging the object, irrespective of the length of the stem.

Special considerations are involved when the equipment is used to harvest crops. Depending on the fruit or vegetables, it frequently is more appropriate to grasp the item by the stem rather than the body. This is because there is more variation in body size, the body is subject to rot that may foul the gripper, and it is important to have control over the stem location. The fruit is manipulated by the gripper in a way which allows the gripper to auto-detect the stem. At this time, the gripper may grip only the stem, depending on the type of fruit.

Alternately, an automatically controlled blade may be activated to cut the stem to separate the fruit.

The robot arm 16 is then moved over a sorting conveyor 46 on the platform 12, the fingers are opened and the object (i.e., the fruit) is carried away to be placed with other harvested products.

It is important that the field be harvested systematically and completely. The camera has a limited field of view and the robot arm has a limited working envelope. Thus, the harvester must be advanced. The length of the advancement is programmable. The platform 12 has wheels or tracks to advance the platform and has a brake to ensure the precise stopping of the harvester and to prevent any drifting during the use cycle. A motion tracking sensor 36 is mounted on the platform to assure the advancement and the braking of the harvester. A steering gear 48 is mounted on the mobile platform 12. The harvester is able to automatically advance through the field following a row of crops.

Figure 8:
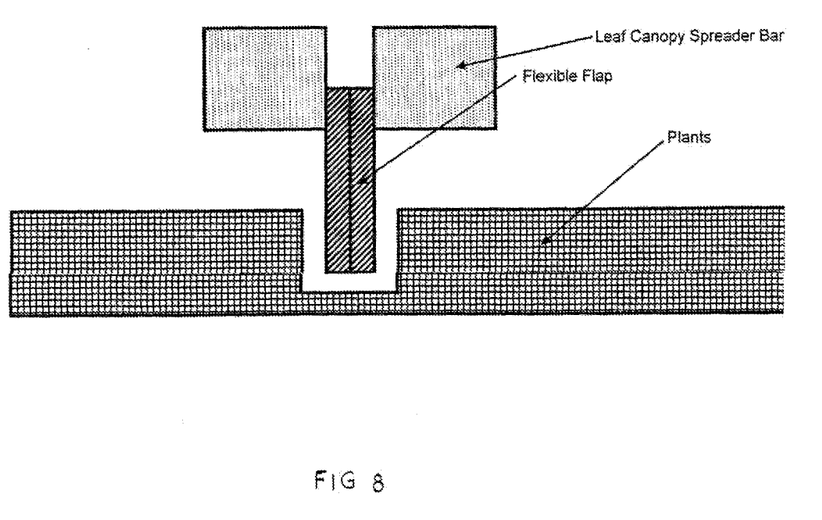
FIG. 8 is a side view of the flexible flap on the canopy spreader.

With some crops, there is foliage which covers the fruit which is to be harvested and the camera cannot view the covered fruit. To overcome this, a canopy spreader 38 is mounted on the platform 12. In a preferred configuration, two parallel horizontal bars are mounted near the platform. When activated, the bars spread apart outwardly from the harvester pushing aside the foliage to expose the fruit. Flexible depending flaps 40 may be attached to the under sides of the bars to accommodate unevenness of the surface of the ground without damaging the plants (FIG. 8). Alternately, the canopy spreader may be a pair of horizontal arms having a first end pivotally mounted under the platform. When activated, each arm sweeps outwardly so that the arm pushes aside the foliage to uncover the fruit.

A hood 42 is provided for the camera 18 and the robot arm 16. The hood is a partially or fully enclosed area with the roof of the hood serving as the deck of the harvester (FIG. 3). There is a light source 44 within the hood so that the device can operate regardless of weather conditions and at night.

Figure 9:
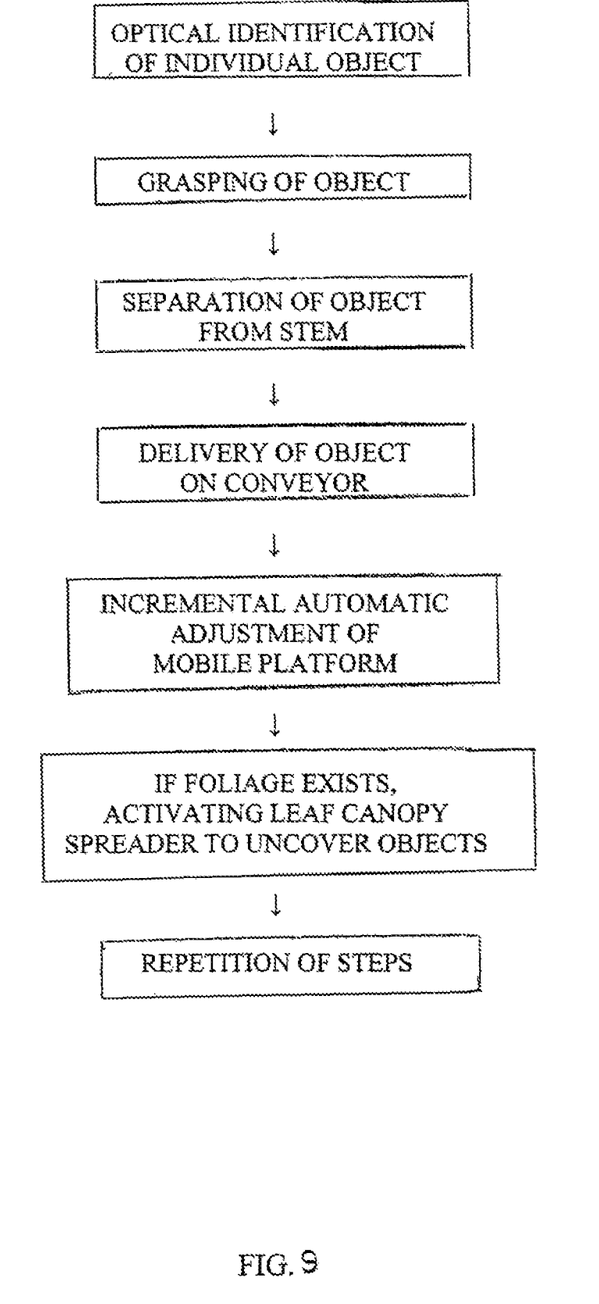
FIG. 9 is a diagrammatic representation of the method of using the robotic harvester of the present invention.

The method of harvesting crops automatically is as follows (FIG. 9). A single stereo image in 3D space provided in 3D space by the stereovision camera 18 is analyzed by the software in the computer 22 to determine if any objects meeting the criteria of color, shape or other specified features are existing in the region which has been viewed by the camera. If such objects are identified, the computer software calculates the XYZ coordinates of the location of each recognized object. The robot arm 16 is moved to the designated XYZ coordinates to scoop the recognized object into the gripper 20. The fingers 26 of the gripper are closed to retain the recognized object. The robot arm 16 is raised to a predetermined height and the tension on a stem attached to the recognized object is measured. The piston plunger 34 within the gripper 20 is moved to forcibly retain the recognized object. The robot arm 16 with the gripper 16 is moved sideways with respect to the stem and the stem is separated from the recognized object. The robot arm 16 is moved over the sorting conveyor 46 and the gripper 20 is opened to deposit the recognized object (the fruit) on the sorting conveyer so the recognized object is moved to the harvested products. The process is repeated to determine whether there are additional recognized objects in the view of the stereovision camera. The mobile platform 12 is advanced a predetermined distance. If there is foliage in the view of the stereo camera, the leaf canopy spreader 38 is activated to push the foliage aside and uncover the recognized object. The above steps are repeated with additional views from the stereovision camera.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A robotic harvester comprising a mobile platform with a power source, a programmable multi-axis robot arm connected to the robotic harvester, a master controller connected to the robotic arm, a stereovision camera mounted on the mobile platform, the master controller being a computer having software programmed to control the robot arm to relate the stereovision camera to the robot arm; a hood that covers the stereovision camera and its field of view; a gripper attached to the robot arm and controllable by the computer, wherein the stereovision camera, with a single measurement, locates and identifies an object in geometric 3D coordinates, the computer directing the robot arm to the object using the geometric coordinates and the gripper grasping the object and removing the object;

wherein the gripper has a plurality of spaced-apart removable fingers, each finger having a pivotable finger tip, the finger tips being rotatable toward each other; the object being grasped between the fingers of the gripper, the object having a stem attached thereto, the stem of the object being disposed and held between two of the fingers wherein stem tension is measurable and wherein movement of the robot arm is able to separate the stem from the object; and wherein at least one retaining wall is formed on the fingers of the gripper.

2. The robot harvester of claim 1, wherein the robot arm is moved sideways with respect to the stem to separate the stem from the object.

3. The robotic harvester of claim 1, wherein a piston plunger is connected to a base of the gripper at a predetermined tension, the piston plunger is activated to pin the object within the gripper.

4. The robotic harvester of claim 1, further comprising a leaf canopy spreader to move foliage on a plant to provide access to the fruit, the leaf canopy spreader having a pair of parallel horizontal bars mounted by the platform of the robotic harvester, the bars being spaced apart horizontally to push aside the foliage to expose the fruit for the gripper to grasp.

5. A robotic harvester comprising a mobile platform with a power source, a programmable multi-axis robot arm connected to the robotic harvester, a master controller connected to the robotic arm, a stereovision camera mounted on the mobile platform, the master controller being a computer having software programmed to control the robot arm to relate the stereovision camera to the robot arm; a hood that covers the stereovision camera and its field of view; a gripper attached to the robot arm and controllable by the computer, wherein the stereovision camera, with a single measurement, locates and identifies an object in geometric 3D coordinates, the computer directing the robot arm to the object using the geometric coordinates and the gripper grasping the object and removing the object;

wherein the gripper has a plurality of spaced-apart removable fingers, each finger having a pivotable finger tip, the finger tips being rotatable toward each other; the object being grasped between the fingers of the gripper, the object having a stem attached thereto, the stem of the object being disposed and held between two of the fingers wherein stem tension is measured and wherein movement of the robot arm separates the stem from the object;

wherein at least one retaining wall is formed on the fingers of the gripper; and further comprising a leaf canopy spreader to move foliage on a plant to provide access to the fruit, the leaf canopy spreader having a pair of parallel horizontal bars mounted by the platform of the robotic harvester, the bars being spaced apart horizontally to push aside the foliage to expose the fruit for the gripper to grasp.

6. The robotic harvester of claim 1, wherein the computer has a program to advance the mobile platform in programmable incremental steps, and the robotic harvester has a brake to ensure precise stopping and a motion tracking sensor to assure the advancement and stopping of the robotic harvester.

7. A method of harvesting crops substantially comprising the steps of: a) providing a mobile platform with a power source, a programmable multi-axis mobile arm having a gripper with fingers connected to the mobile platform, a stereovision camera mounted on the mobile platform, a computer having software programmed to control the robot arm and the gripper and to relate the stereovision camera to the robot arm; b) recording a single stereo image in 3D space of a region under the platform; c) using the software to analyze the image to determine if objects meeting certain criteria exist within the regions; d) using the software to calculate XYZ coordinates of the location of each recognized object; e) moving the robot arm to scoop the recognized object into the gripper and closing the fingers on the gripper to retain the recognized object; f) raising the recognized object a predetermined height and measuring the tension on a stem attached to the recognized object; g) moving a piston plunger within the gripper to forcibly retain the recognized object; h) moving the robot arm with the gripper sideways with respect to the stem to separate the recognized object from the stem; i) moving the robot arm over a conveyor on the mobile platform and opening the gripper to deposit the recognized object on the sorting conveyor; j) repeating steps b) through i) for remaining objects; k) advancing the mobile platform a predetermined distance; l) providing a leaf canopy spreader and if heavy foliage exists activating the leaf canopy spreader to uncover objects; m) repeating steps b) through l).

8. The robotic harvester of claim 5, wherein each horizontal bar has depending flexible flaps attached thereto wherein the flexible flaps avoid damage to the plant.

9. The robotic harvester of claim 5, wherein the computer has a program to advance the mobile platform in programmable incremental steps, and the robotic harvester has a brake to ensure precise stopping and a motion tracking sensor to assure the advancement and stopping of the robotic harvester.

* * * * *